United States Patent [19]

Piereder

[11] Patent Number: 5,352,151
[45] Date of Patent: Oct. 4, 1994

[54] APPARATUS FOR APPLYING CASING TO A STUFFING HORN AND METHOD OF USE THEREOF

[75] Inventor: Ludwig Piereder, Waterloo, Canada

[73] Assignee: Handtmann Piereder Machinery Ltd., Waterloo, Canada

[21] Appl. No.: 130,336

[22] Filed: Oct. 1, 1993

[51] Int. Cl.$^5$ .......................................... A22C 13/00
[52] U.S. Cl. ........................................ 452/32; 452/33
[58] Field of Search .................. 452/32, 33, 34, 21, 452/, 22, 29, 30

[56] References Cited

U.S. PATENT DOCUMENTS

| | | | |
|---|---|---|---|
| 3,919,739 | 11/1975 | Kawai | 452/33 |
| 4,307,488 | 12/1981 | Lofland et al. | 452/32 |
| 4,535,506 | 8/1985 | Hendriks et al. | 452/32 |
| 4,547,932 | 10/1985 | Romeike et al. | 452/32 |
| 4,660,254 | 4/1987 | Kollross | 452/34 |
| 5,092,814 | 3/1992 | Kasai et al. | 452/32 |
| 5,217,404 | 6/1993 | Lanfrey | 452/32 |

Primary Examiner—Willis Little
Attorney, Agent, or Firm—Kenneth M. Garrett

[57] ABSTRACT

A shuttle for advancing the free end of a flat sleeve of casing onto a stuffing horn includes a bore therethrough and a vacuum manifold which causes the casing to expand into gripping relationship with the bore, to permit the shuttle and casing end to be advanced onto the horn. When vacuum is released from the manifold, the casing is released from the gripping relation with the shuttle bore and moves towards a gripping relation with the horn, which is increased by reducing the pressure in the horn. This permits the shuttle to be withdrawn at least sufficiently to apply a casing brake to lock the casing to the horn. The shuttle is also used to consolidate meat stuffed into the casing by locking the casing to the shuttle with the vacuum manifold and moving the shuttle away from a restricting orifice surrounding the casing.

23 Claims, 4 Drawing Sheets

APPARATUS FOR APPLYING CASING TO A STUFFING HORN AND METHOD OF USE THEREOF

FIELD OF INVENTION

This invention relates to apparatus and method for automatically connecting tubular casing stored in a flat form onto a tubular horn through which meat is stuffed into the casing.

BACKGROUND OF INVENTION

De-boned whole muscle meat, for example as is used in the preparation of hams, is commonly sealed within a tubular casing. In one form of apparatus, the casing is shirred, and an appreciable length is placed on a tubular horn through which the meat is stuffed by extrusion into the casing, in a manner generally similar to that in which sausages are formed. This method is relatively labour intensive, and the shirred casing is relatively expensive. In accordance with a second method, the casing is stored in a flat condition in a roll, and the apparatus includes a shuttle which automatically connects the free end of the casing to the stuffing horn. In accordance with a first variation of this second method, the outlet end of the stuffing horn is conically tapered to a diameter which is appreciably less than that of a the casing so as to facilitate the engagement of the free end of the casing therewith. The reduced diameter of the horn end increases the difficulty of filling the casing.

In a second variation of this second method, fingers are used to expand the free end of the casing, and an extensible stuffing horn is inserted into the casing end when expanded in this manner. This type of apparatus is mechanically complex, and leakage of meat juices past the fingers is sometimes experienced.

It is generally desirable to consolidate the meat within the casing, and in all variations of the second method that have been proposed prior hereto, special adjustment cylinders are used in this consolidation step which serve to draw the stuffed casing rearwardly through a consolidation orifice. It would be preferable to use the shuttle both for advancing the casing onto the horn, and for drawing the stuffed casing through a consolidating orifice.

It is an object of this invention to provide improved apparatus of this second type.

It is another object of this invention to provide apparatus which does not require any restriction in the diameter of the stuffing horn, or any mechanically moving parts for expanding the free end of the casing in order to couple it to the horn.

It is still another object of this invention to provide apparatus of the foregoing type which does not require any major modification of the horn from that which is used in connection with shirred casing, for example.

It is yet another object of this invention to provide apparatus wherein the shuttle may be used both for advancing the casing onto the stuffing horn, and for pulling the casing away from the stuffing horn, to permit its use in the consolidation of the meat within the casing.

DESCRIPTION OF THE PREFERRED EMBODIMENT

Figure 1:
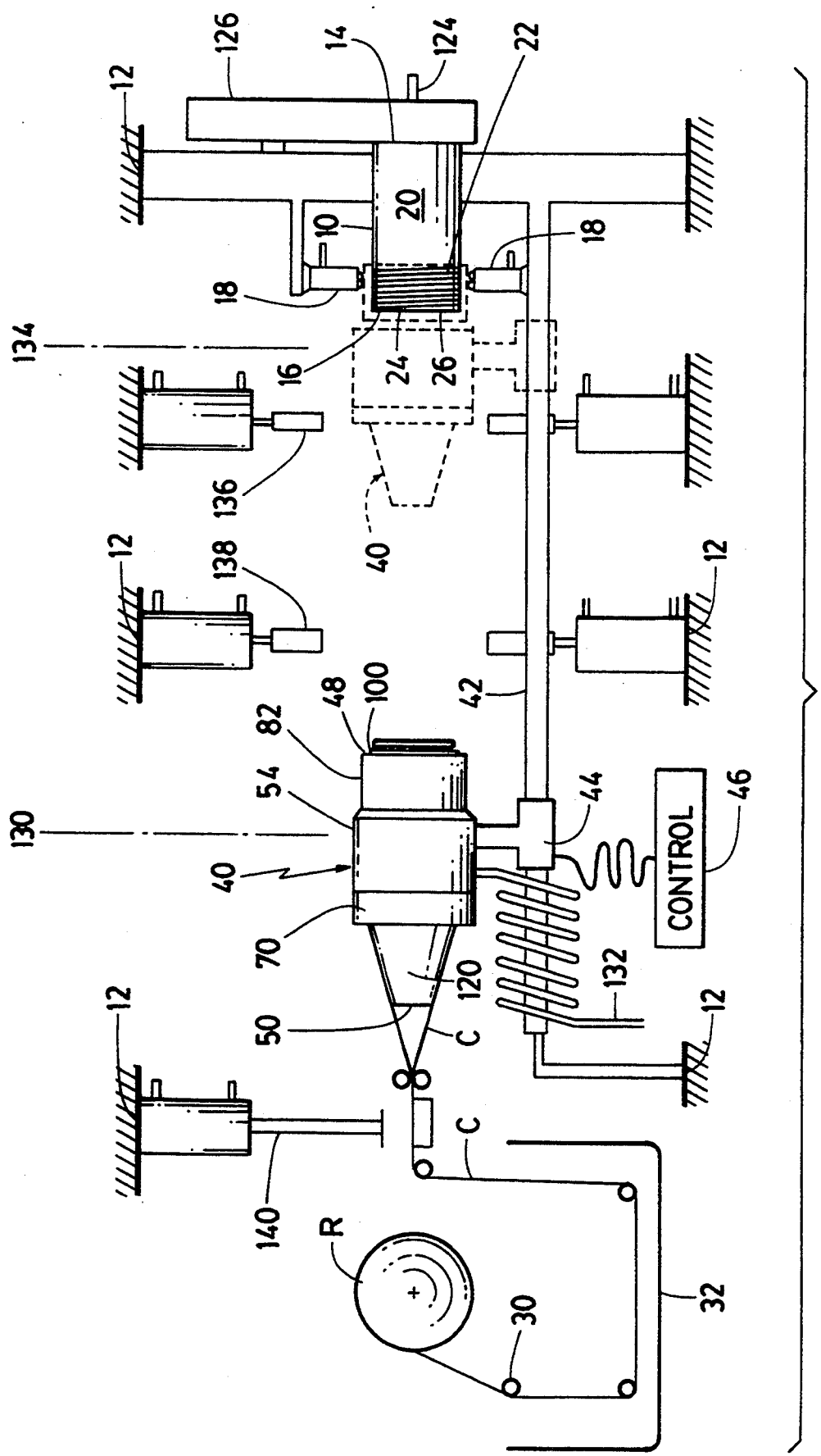
FIG. 1 shows in schematic form, apparatus for stuffing meat into casing sleeves drawn from a flat roll thereof accordance with the invention.

Referring to the drawings in detail, wherein the reference numerals are used throughout the drawings to designate like parts, apparatus for stuffing meat comprises a stuffing horn 10 supported from a chassis 12, the horn having an inlet end 14 and an outlet end 16.

A casing brake 18 is disposed in radially opposed relationship to horn 10 adjacent the outlet end 16 thereof. As here illustrated, only diametrically opposed portions of casing brake 18 are shown, but typically, the casing brake will encircle the horn 10 in somewhat spaced apart relationship therewith. A suitable casing brake is described in U.S. Pat. No. 4,651,498, having common inventorship herewith.

The exterior peripheral surface 20 of horn 10 adjacent the outlet end 16 thereof is provided with a machine screw thread 22, and the end wall 24 is provided with one or more small notches 26 extending thereacross, the notch or notches and thread together forming a small gas flow passage for a purpose to be subsequently referred to.

The stuffing apparatus will normally employ a tubular caring C stored as a roll R in flattened form, front which it is drawn over rollers 30, and passed through a conditioning bath 32, as generally known in the art.

The stuffing apparatus further comprises a shuttle 40 which is mounted for movement along a track 42 towards and from horn 10 coaxially therewith, using a drive motor 44 acting under the influence of a controller 46. A servo drive is preferred for use as drive motor 44 in order to facilitate the accurate positioning of the shuttle 40 along track 42 at different stations during the course of the operation of the apparatus, as will be later described, but other drive means may be used as will be apparent to persons skilled in the art.

Shuttle 40 has a forward end 48 and a rearward end 50, and a notional axis 52 extending therebetween, and incudes an outer member 54 having an axial bore 56 extending therethrough, and a core member 58. Core member 58 is coaxially mounted within bore 56 by means of a ball roller arrangement 60. Arrangement 60 includes a radial bore 64 passing through the wall of outer member 54 and a corresponding radial recess 66 in core member 58. A ball 68 captured in radial bore 64 by means of a locking ring 70, which is mounted from outer member 54 so as to be rotatable about axis 52. Ring 70 has a ramp surface 72 on the interior facing wall thereof. Rotation of locking ring 70 in one direction causes ramp surface 72 to urge ball 68 into recess 66 to lock the core member 58 to the outer member 54. Rotation of locking ring 70 in the reverse direction permits ball 68 to be disengaged from recess 66 and unlock the core member, permitting it to be withdrawn from outer member 54. Suitably, arrangement 60 will include three balls 68 mounted in angularly spaced apart relationship about the periphery of outer member 54. Also suitably, arrangement 60 includes a click lock 74 for retaining locking ring 70 in its locking position.

Outer bore member 54 is provided with a transition step 80 therearound which delineates a forward end portion 82 of outer member 54. Forwardly of transition step 80, the diameter of bore 56 is somewhat enlarged so as to be marginally greater than that of horn 10, and the external diameter of the outer member in this forward end portion over most of its length is marginally less than the internal diameter of casing brake 18. Accordingly, the forward end portion 82 of outer member 54 can be slidingly received over horn 10 with casing brake 18 in surrounding relationship with the forward end portion.

Outer member 54 includes a gas flow manifold 84 which comprises a plenum 86 circumscribing the outer member rearwardly of transition step 80, and a plurality of passages 88 which extend through transition step 80 in equispaced relationship therearound, which passages interconnect at the rearward end thereof with plenum 86 and at the forward end with shallow grooves 90, which extend axially along bore 56 to closely adjacent the forward end 48 of the outer member, where they are intersected by a shallow radial groove 92 which circumscribes bore 56.

Core member 58 includes a head 100 in the form of a smooth cylindrical plug which is suitably of relatively constant diameter therealong. Head 100 is mounted from the rearward portion of core member 58 by shall 102 and is forwardly biased by a helical spring 104, with nut 106 serving to adjust the forward extent of travel of head 100. Head 100 has a diameter marginally smaller than that of bore 56 adjacent the forward portion thereof so as to leave a small space for the passage of casing C therebetween, and is of limited axial extent. Head 100 is provided with an axial flow passage 110 therethrough. A valve 112 is mounted from head 100 by a valve stem 114, to be movable between a rearward position in which it acts to close flow passage 110, and a forward position in which the flow passage is open, with a spring 116 biasing the valve to the forward position.

Core member 58 includes a conically tapered portion 120 which projects rearwardly beyond the rearward end of outer member 54; a gas flow passage 122 extends axially through conical portion 120 in gas flow, relationship with flow passage 110.

An air outlet tube 124 is mounted on a capstan 126 on which a stuffing ram (not shown) and meat supply duct (not shown) may be also mounted, the rotation of the capstan serving to move the air outlet tube etc. into flow communication with the inlet end 14 of horn 10 as desired.

Figure 2:
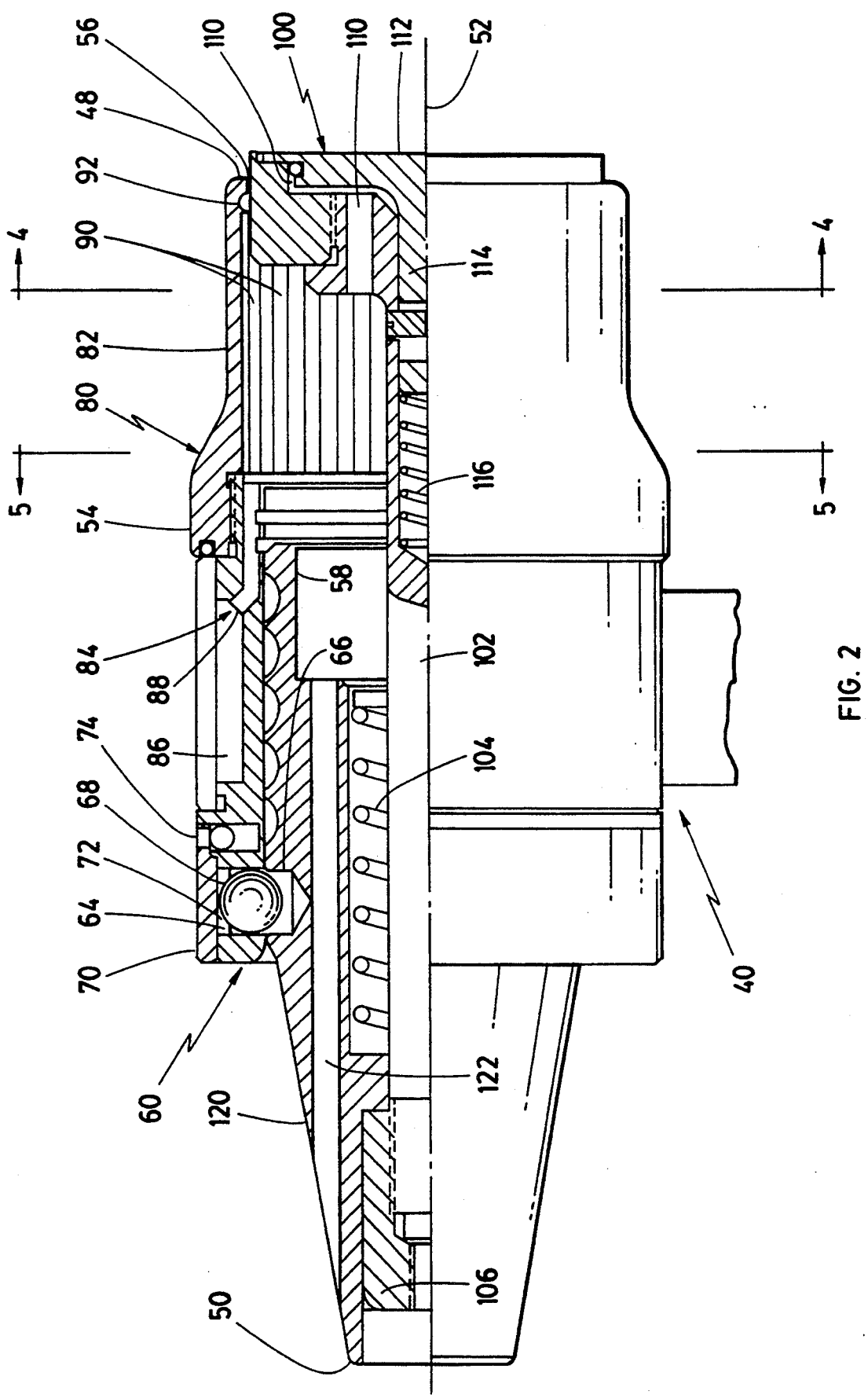
FIG. 2 shows in mid transverse section, a shuttle for use with the apparatus of FIG. 1 with a valve in its closed position.
Figure 3:
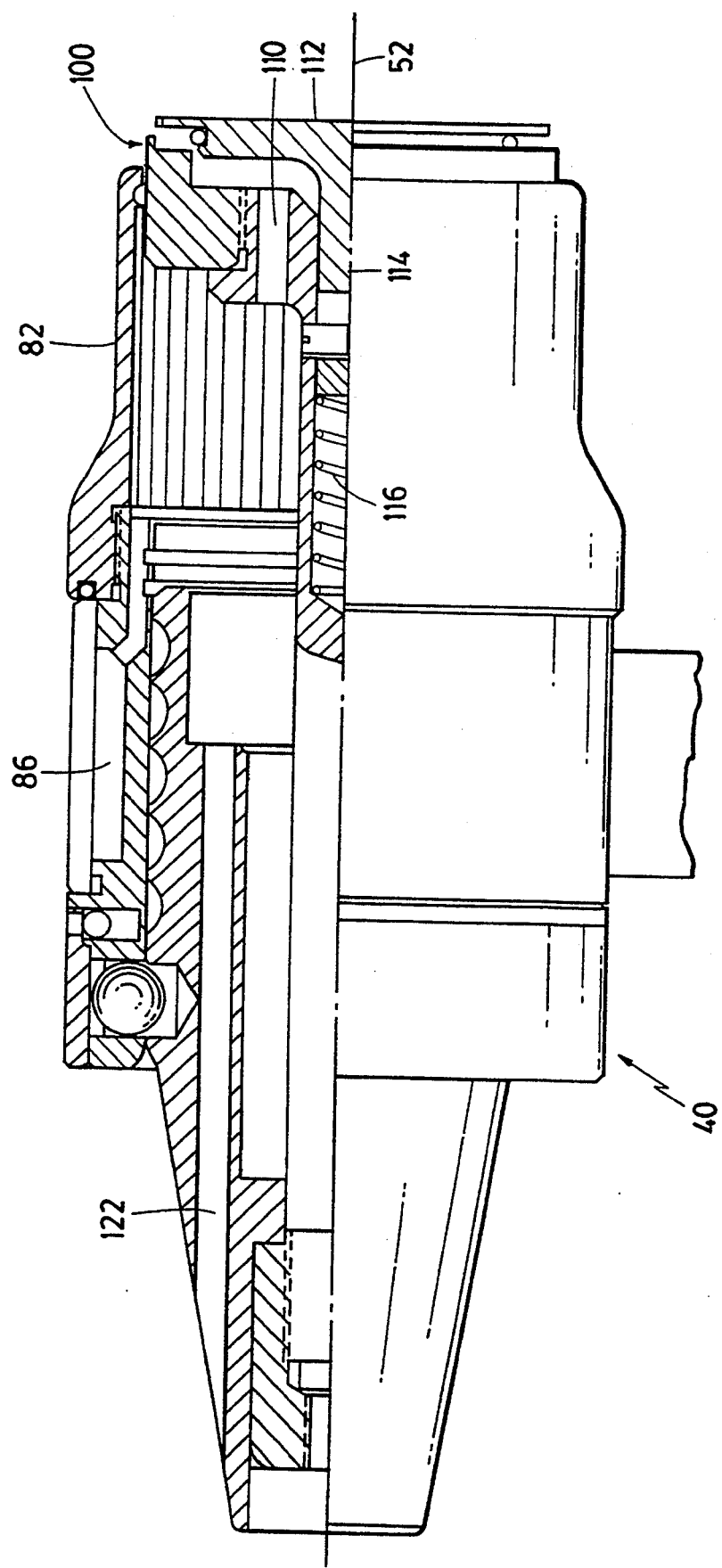
FIG. 3 shows the shuttle of FIG. 2 with the valve in its open position.
Figure 5:
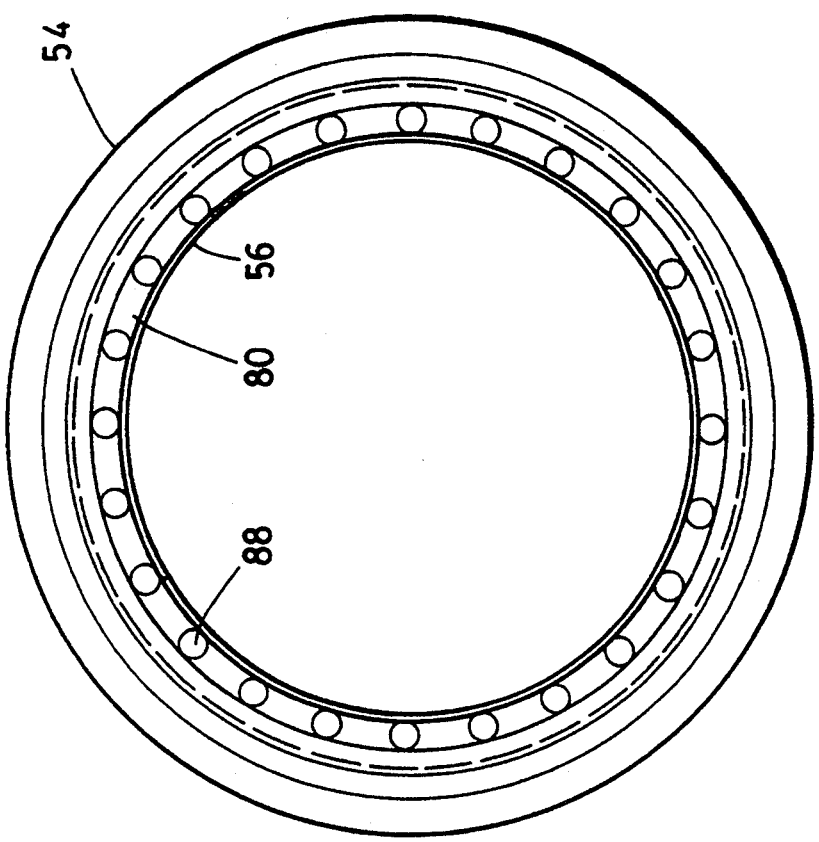
FIG. 5 is similar to FIG. 4 along 5—5 of FIG. 2
Figure 4:
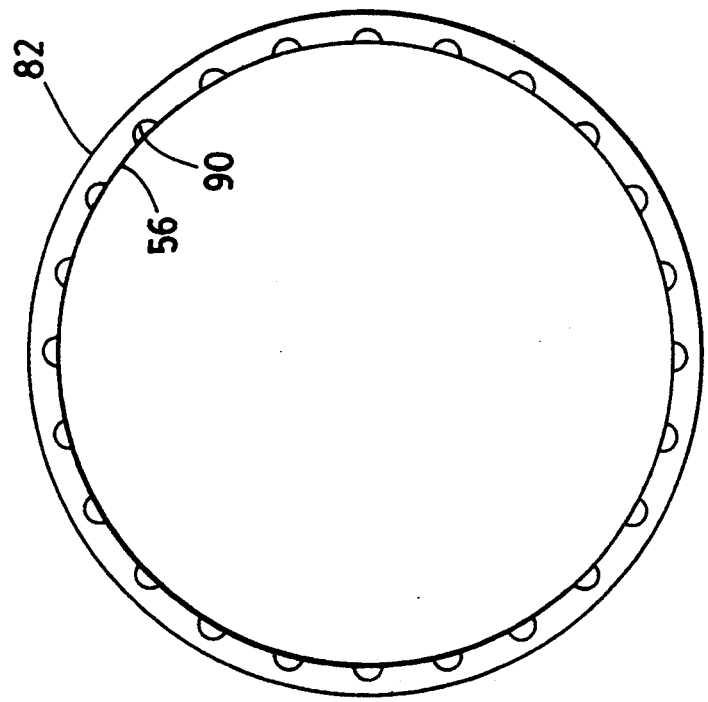
FIG. 4 is a view along 4—4 of FIG. 2, on enlarged scale, with the core member removed for clarity.

Considering now the operation of the apparatus as thus far described, shuttle 40 is prepared by uncoupling core member 58 from the outer member 54, and threading casing C from roll R over the core member. The internal diameter of the casing C will normally be selected such that the casing will be slightly expanded where it passes over head 100. With the casing C disposed on the core member 58, the core member is then locked to the outer member 54, and the forward end of the casing is trimmed so as to be approximately flush in a vertical plane with the forward end of valve 112 when the shuttle is disposed at a first station 130 remote from horn 10. It may be noted that while head 100 is shown in FIGS. 2 and 3 as projecting somewhat forwardly of the forward end of outer member 54, this is for the clarity of illustrating valve 112, and generally spearing the axial position of head 100 will be adjusted with nut 106 so as not to protrude forwardly by any appreciable extent of the forward end of outer member 54, as there is no advantage in its doing so, the function of head 100 being primarily to locate casing C in close proximity to grooves 90 and 92. A filling cycle is initiated by exhausting air from manifold 84 through plenum 86 and hose 132 connected thereto. It will be appreciated that head 100 holds casing C in close proximity to the grooves 90 and 92, and that air is more rapidly exhausted from manifold 84 than will flow through the narrow gap intermediate the casing and the bore 56. Accordingly, casing C will be drawn towards grooves 90 and 92, causing the casing C to expand elastically and be gripped very strongly onto the interior surface of the forward end portion 82 of the outer member 54. Shuttle 40 is then advanced towards a second station 134 wherein the forward end portion 82 receives the outlet end 16 of horn 10 therein. Shortly prior to reaching the second station 134, valve 112 moves into abutment with the end wall 24 of horn 10, to close air flow passage 110, and still further advance of shuttle 40 will force head 100 and valve 112 therewith towards the rearward end 50 of the shuttle against the bias of spring 104.

When shuttle 40 is positioned at the second station 134, the vacuum is released from manifold 84, causing casing C to be released from its gripping relationship with grooves 90, 92 of the outer member 54 of the shuttle, and to move towards a gripping relationship with horn 10. This gripping relationship is increased by exhausting air from the interior of horn 10 through air outlet tube 124. Notches 26 disposed in the end wall 24 of the horn, together with machine thread 22 on the outer surface of the horn, together form a small air passage from which air is exhausted from between casing C and the horn. With the casing C gripped to horn 10 temporarily in this manner, shuttle 40 is then moved back towards the first station 130 by an amount at least sufficient to permit casing brake 18 to be actuated to grip the casing very firmly onto horn 10, following which the shuttle is moved back to first station 130. A measured quantity of meat is then stuffed into casing C, and any air in the casing which is displaced by the meat will flow through air flow passages 110 and 122 into empty casing disposed rearwardly of the shuttle. When the meat has been stuffed into casing C, the casing is clipped at a clipping unit 136 to seal the casing at the horn end, and casing brake 18 is then released. The meat is then consolidated in casing C by again exhausting manifold 84 to cause the casing to grip strongly onto shuttle 40, and moving the shuttle rearwardly while restraining the passage of the meat with a consolidating orifice associated with a second clipping unit 138. With the meat consolidated in this manner, the casing is clipped and severed. The rearward movement of the shuttle 40 in the consolidating step also serves to detach the casing from horn 10. The cycle is completed by clamping the casing at a casing clamp 140 disposed rearwardly of the first station 130, and advancing the shuttle 40 back to the first station 130, when the free end of casing C is in approximate alignment with shuttle forward end 48, then releasing casing clamp 140.

I claim:

1. Apparatus for stuffing meat into a casing from a supply thereof in flat tubular form comprising
   a stuffing horn having an exit end;

a casing brake generally surrounding said horn adjacent said exit end;

a shuttle for use in transporting casing from said supply for coupling to said horn, said shuttle comprising an outer tubular member a core member;

roller means for mounting said core member within said outer member in coaxial axially fixed, radically spaced apart relationship therewith to permit the passage of said tubular casing therebetween;

means for moving said shuttle between a first station remote from said horn and a second station forwardly of said first station adjacent said horn;

means for releasably locking said casing to said shuttle during movement from said first station to said second station so as to draw casing from said supply to said horn;

characterized wherein said means for releasably locking said casing to said shuttle comprises a vacuum manifold disposed on the interior surface of said outer member adjacent the forward end thereof, and means for applying a vacuum to said vacuum manifold to cause forward end portions of said casing to be urged into gripping relationship with said inner wall surface of said outer member.

2. An apparatus as defined in claim 1 wherein said forward end of said outer member is proportioned so as to be telescopically received over said horn beneath said casing brake.

3. An apparatus as defined in claim 2 including means for applying a vacuum within said horn to evacuate the interior of said casing attached to said horn, and means for selectively connecting said vacuum applying means to said horn.

4. An apparatus as defined in claim 3 wherein said horn and said shuttle are structured to provide a vacuum flow path between the interior of said horn and the exterior surface thereof when said casing is disposed over said horn.

5. An apparatus as defined in claim 4 wherein said core member includes a head portion and a rearward portion;

means mounting said head portion from said rearward portion for axial movement with respect thereto between a forward position and a rearward position in which said head portion is generally recessed within said outer member, and means biasing said head portion towards said forward position.

6. An apparatus as defined in claim 5 wherein said head portion of said core member is in the form of a smooth cylindrical plug of generally constant diameter.

7. An apparatus as defined in claim 5 wherein said head portion has an outside diameter along its length generally equal to the external diameter of said horn at said exit.

8. An apparatus as defined in claim 6 wherein said horn has a generally constant diameter along its length.

9. An apparatus as defined in claim 5 wherein said core member is provided with an axial passageway therethrough, and further comprising valve means for opening and closing said passageway and valve bias means biasing said valve means to a normally open position; said valve means being disposed to contact said horn when said shuttle is proximate said horn so as to be urged against the bias of said valve bias means into a position to close said passageway at said forward portion of said shuttle moves towards its rearward position.

10. An apparatus as defined in claim 9 wherein said valve means is reciprocally mounted from said head portion.

11. A shuttle for use in transporting the free end of a sleeve of casing of indefinite length into surrounding relationship with the end of a tubular horn comprising an outer member having a tubular bore therethrough;

a core member;

each of said members having a forward end and a rearward end axially spaced apart therefrom;

roller means mounting said core member within said outer member in coaxial, spaced apart relationship characterized wherein said shuttle is provided with a vacuum manifold on the inner surface of the forward end thereof.

12. A shuttle as defined in claim 11 wherein said core member includes a head portion and a rearward portion; means mounting said head portion from said rearward portion for reciprocal movement relative thereof; and means forwardly biasing said head portion.

13. A shuttle as defined in claim 12 wherein said core member has a passage for the axial flow of air therethrough, and normally open valve means for selectively closing said passage.

14. A shuttle as defined in claim 13 wherein said valve means includes at least one portion disposed at the forward end of said core member adjacent the outer periphery thereof.

15. A shuttle as defined in claim 11 wherein said roller means comprises at least three roller bails captured at peripherally spaced apart intervals between said outer member and said core member.

16. A shuttle as defined in claim 15 comprising a release ring rotatably mounted from said outer member for movement between a first position serving to capture said roller balls and a second position serving to release said roller balls and permit the withdrawal of said core member from said outer member.

17. Method for the production of meat stuffed into a casing using a stuffing horn having an exit end including the steps of:

providing a flat sleeve of casing having a free end from a supply of casing;

providing a shuffle including a tubular outer wall and a core coaxially mounted from said outer wall with a tubular space therebetween;

threading said sleeve through said tubular space with said free end proximate the forward end of said outer wall;

then locking said casing to said shuttle and advancing said shuffle whereby said free end is in surrounding relationship with the exit end of said horn;

characterized wherein said casing is locked to said shuttle by applying a reduced pressure between said casing and said outer wall around the periphery thereof;

and wherein said shuttle is advanced to a position wherein said free end is in surrounding relationship with said exit end of said horn while locked to said outer wall of said shuttle.

18. A method as defined in claim 17 wherein following the advance of said shuttle with said casing locked thereto into surrounding relationship with said horn, said vacuum is released and a pressure differential is created across said free end in a sense to urge said free end into gripping relationship with said horn.

19. A method as defined in claim 18 wherein said differential pressure is created by applying a vacuum to said horn on the interior thereof.

20. A method as defined in claim 17 following the application of said differential pressure said shuttle is removed from surrounding relationship with said horn; then locking said free end to said horn using a casing brake.

21. A method as defined in claim 17 comprising the further step of providing a normally open valve which permits the flow of air through said core member between axially opposed end thereof, and wherein said horn acts to close said valve for such time as said outer wall is in surrounding relationship with said horn.

22. A method as defined in claim 17 comprising the following steps subsequent to the stuffing of meat into said casing:

applying a restricting orifice about said casing intermediate said shuttle and the axial end of meat stuffed with the casing;

applying a vacuum to lock the casing to the shuttle;

moving the shuttle away from the orifice to consolidate the meat within the casing; then clipping and severing the casing to seal the meat therein and create a new free end of the casing;

clamping the casing intermediate the supply thereof and the shuttle;

releasing the vacuum from the shuttle;

removing the restricting orifice; and advancing the shuttle to a point where the new free end is proximate the forward end of the shuttle.

23. A method as defined in claim 22 wherein said shuttle serves to pull the casing from the exit end of the horn as it moves away from the orifice to consolidate the meat.

* * * * *